United States Patent
Webber

(10) Patent No.: US 6,857,030 B2
(45) Date of Patent: Feb. 15, 2005

(54) METHODS, SYSTEM AND ARTICLE OF MANUFACTURE FOR PRE-FETCHING DESCRIPTORS

(75) Inventor: Thomas P. Webber, Petersham, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 202 days.

(21) Appl. No.: 09/949,928

(22) Filed: Sep. 12, 2001

(65) Prior Publication Data

US 2003/0051076 A1 Mar. 13, 2003

(51) Int. Cl.$^7$ ............................. G06F 3/00; G06F 13/14; G06F 13/28
(52) U.S. Cl. ................................. 710/33; 710/5; 710/6; 710/35
(58) Field of Search .......................... 710/6, 5, 33, 35, 710/54; 382/100, 195; 711/155, 154

(56) References Cited

U.S. PATENT DOCUMENTS

| | | | |
|---|---|---|---|
| 5,713,044 A | 1/1998 | Gillespie et al. | 395/842 |
| 5,815,729 A | 9/1998 | Henry et al. | 395/800.32 |
| 5,870,627 A | 2/1999 | O'Toole et al. | 395/842 |
| 6,202,107 B1 | 3/2001 | Collier | 710/22 |
| 6,411,724 B1 * | 6/2002 | Vaithilingam et al. | 382/100 |
| 6,643,757 B2 * | 11/2003 | Fontijn | 711/202 |

FOREIGN PATENT DOCUMENTS

NL 1414273 A1 * 4/2004 ............. H04S/1/00

* cited by examiner

Primary Examiner—Jeffrey Gaffin
Assistant Examiner—Joshua Schneider
(74) Attorney, Agent, or Firm—Finnegan, Henderson, Farabow, Garrett & Dunner, L.L.P.

(57) ABSTRACT

A system and method for reducing the number of memory accesses by a hardware device to a descriptor memory is disclosed. Methods, systems and articles of manufacture consistent with the present invention enable software to embed a subsequent descriptor it is posting in the descriptor memory into a current descriptor listed in the descriptor memory. Additionally, hardware is configured to transmit a data packet associated with the current descriptor to a recipient device. When hardware receives an acknowledgment message from the recipient device associated with the transmitted data packet, it fetches the current descriptor to update a completion code within the current descriptor using a Read-Modify-Write (RMW) transfer sequence. As part of the RMW memory operation, hardware may use the embedded copy of the subsequent descriptor within the current descriptor to transmit the next data packet associated with the subsequent descriptor. This process avoids hardware from having to fetch the embedded descriptor from the descriptor memory before transmitting the next data packet.

20 Claims, 9 Drawing Sheets

METHODS, SYSTEM AND ARTICLE OF MANUFACTURE FOR PRE-FETCHING DESCRIPTORS

DESCRIPTION OF THE INVENTION

1. Field of the Invention

This invention relates to data transfer systems and, more particularly, to methods, systems, and articles of manufacture for optimizing Read-Modify-Write operations of data transfer systems.

2. Background of the Invention

Input/Output ("I/O") devices are well known elements of modem day computer systems. Depending on their type and configuration, I/O devices may reduce aspects associated with the central processing ("CPU") of a computer system by handling selected tasks associated with the exchange of data between elements of the system. One known type of I/O device is the direct memory access ("DMA") unit. A DMA unit is often employed by a computer system to manage the transfer of data to and from selected memory devices not normally accessible by the CPU of the system.

Although the advantages of employing I/O devices in a computer system are well known, directly attaching such devices to a system bus of a computer system may create bottlenecks when sufficient bandwidth cannot be supplied to the I/O devices. Once a bottleneck is identified, efforts are generally made to reduce extraneous data transfers across the system bus. One such extraneous data transfer is when an I/O device, such as a DMA unit, wants to write one or two bytes of data to a memory attached to a system bus, but is only allowed to read and write entire cachelines because of the protocol associated with the system bus.

To compound the problem, some system bus protocols, such as the protocol oriented towards cache-coherency needed by Symmetrical Multiprocessing ("SMP") systems, often require devices to execute a Read-Modify-Write ("RMW") operation instead of a simple byte write. A RMW operation requires a device to read data that is targeted for modification, make changes to the data, and then write the changed data back to memory. Therefore, for example, an I/O device that wants to write a single byte of information to memory attached to a system bus that requires cacheline sized data transfers would have to: (1) read an entire cacheline of data; (2) modify one byte of a copy of the read cacheline of data; and (3) write the modified cacheline of data back to memory. Thus, the bandwidth limitations associated with such a system bus may be compounded as the number of data writes to memory grows.

In system bus protocols that employ descriptors to access memory, the affects of the RMW operations can have drastic efficiency ramifications. Descriptors are instructions that are generally created by software (executed by a processor) and identifies to hardware, such as an I/O device, the type of data packet to transmit. Each time the processor wants to transmit data, it may generate a descriptor and store it in local memory. The I/O device then accesses the local memory, via a system bus, reads the descriptor, and transmits the data associated with the descriptor. Software may write several descriptors to consecutive memory addresses as a list, located in the local memory. Knowing the beginning of the list, hardware can service these descriptors by reading them one at a time and performing the task of transmitting a data packet associated with each descriptor. For example, if the software wants to send a data packet over a network, it writes a descriptor of the data packet to the list in memory. Hardware eventually reads the new descriptor from the beginning of the list and processes it according to the instruction in the descriptor. Accordingly, when tasks are performed that require a large number of data transmissions, the bandwidth and RMW requirement associated with the system bus protocol may cause bottlenecks on the system bus.

Protocols that use descriptors as described above, may also have hardware notify software once a packet has been transmitted and acknowledged by a recipient of the packet. Hardware notifies software that the work defined by the descriptor has been completed by writing a code back to the original descriptor. Only one field of the descriptor is over-written. The remaining fields of the descriptor are preserved with information still required by the software. Although this hardware-software handshake is effective, it is dependent upon system bus characteristics and may result in the transfer of many extraneous extra bytes.

Some system buses only permit writes of certain sizes, such as a cachelines. The field holding the notification data may be, for example, only two bytes long. Therefore, for these two bytes to be written, an entire cacheline has to be read from memory, the specified two bytes written to the appropriate field within the descriptor, and the modified cacheline written back to memory. In system busses with cachelines of 64 bytes, that comes to 128 bytes transferred instead of only the desired two bytes.

FIG. 1. illustrates an exemplary data transfer sequence associated with a computer system implementing a system bus protocol using descriptors. As shown, the sequence begins when software posts a descriptor in a memory list (Step 1—Post Descriptor). Hardware then reads the descriptor to transmit a packet of data by requesting the descriptor (Step 2—Read Request) and reading the descriptor (Step 3—Read Data). Once the descriptor is received, hardware then transmits a data packet in accordance with the descriptor (Step 4—Send Packet). At some point, software may post a second descriptor associated with another packet of data to be sent (Step 5—Post Descriptor). Later, when hardware receives an acknowledgment for the first data packet transmitted (Step 6—Acknowledgment), a RMW is executed to write a two-byte completion code to the first descriptor. The first descriptor is re-fetched from memory (Step 7—Read Request and Step 8—Read Data), and written back to memory after modification of the two bytes (Step 9—Write Request and Data). Hardware then reads the next descriptor in the list and follows a sequence similar to that associated with the first descriptor (Steps 10–16). As can be seen, the sequence depicted in FIG. 1 results in a repeating read-RMW sequence for each descriptor (Steps 2, 3, and 7–9 for the first descriptor, and Steps 10, 11 and 14–16 for the next descriptor). Thus, the same cacheline is read twice and written once by hardware.

Several modifications may be made to optimize the "three-transfer sequence" depicted in FIG. 1. One optimization may have hardware save the descriptor until the acknowledgment packet arrives, write the completion code to the saved copy and then write the modified descriptor back to memory. This would result in a "two-transfer sequence." Although this optimization may be effective theoretically, hardware is allowed to send virtually an unlimited number of packets before the first acknowledgment arrives. Other packets may be transmitted from the same list or from different lists because hardware can support literally thousands of separate lists of descriptors. Because hardware can transmit more packets before the first descriptor is acknowledged and processed, several packets may be outstanding and unacknowledged at any given time. Accordingly, if hardware were to retain copies of descriptors for all outstanding packets, it would either have to limit the number of packets it can have outstanding, or require large memories to hold copies of the descriptors. The former detracts from performance and the latter adds costs.

SUMMARY OF THE INVENTION

It is therefore desirable to have a method and system that eliminates one of the memory reads from the read-RMW sequence described above when more than one descriptor is present in a descriptor list.

Methods, systems and articles of manufacture consistent with certain principles related to the present invention enable software to embed an abbreviated copy of a posted descriptor into a previous descriptor included in the descriptor list. An abbreviated copy of a posted descriptor uses leftover space in a previous descriptor such that the size of the abbreviated copy does not cause the previous descriptor to exceed a predetermined size. When hardware re-fetches a current descriptor (prompted by the arrival of an acknowledgment message) as part of the RMW memory operation, it uses the embedded abbreviated copy of the subsequent descriptor to transmit the next data packet. This avoids the initial read of the subsequent descriptor.

Additionally, methods, systems and articles of manufacture enable software to distinguish between different sized descriptors, and avoid embedding a subsequent descriptor into a current descriptor when the subsequent descriptor will not fit within the current descriptor.

Methods, systems and articles of manufacture consistent with the present invention may also enable hardware to save a copy of a descriptor when its associated data packet is sent, and use this copy to determine whether the descriptor includes an embedded descriptor. In one aspect of the invention, a flag is set within a current descriptor by software when it embeds a subsequent descriptor, and hardware checks the status of this flag within the copy retained by hardware to detect the presence of the embedded subsequent descriptor.

Additional aspects of the invention will be set forth in part in the description which follows, and in part will be obvious from the description, or may be learned by practice of methods, systems, and articles of manufacture consistent with features of the present invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Figure 1:
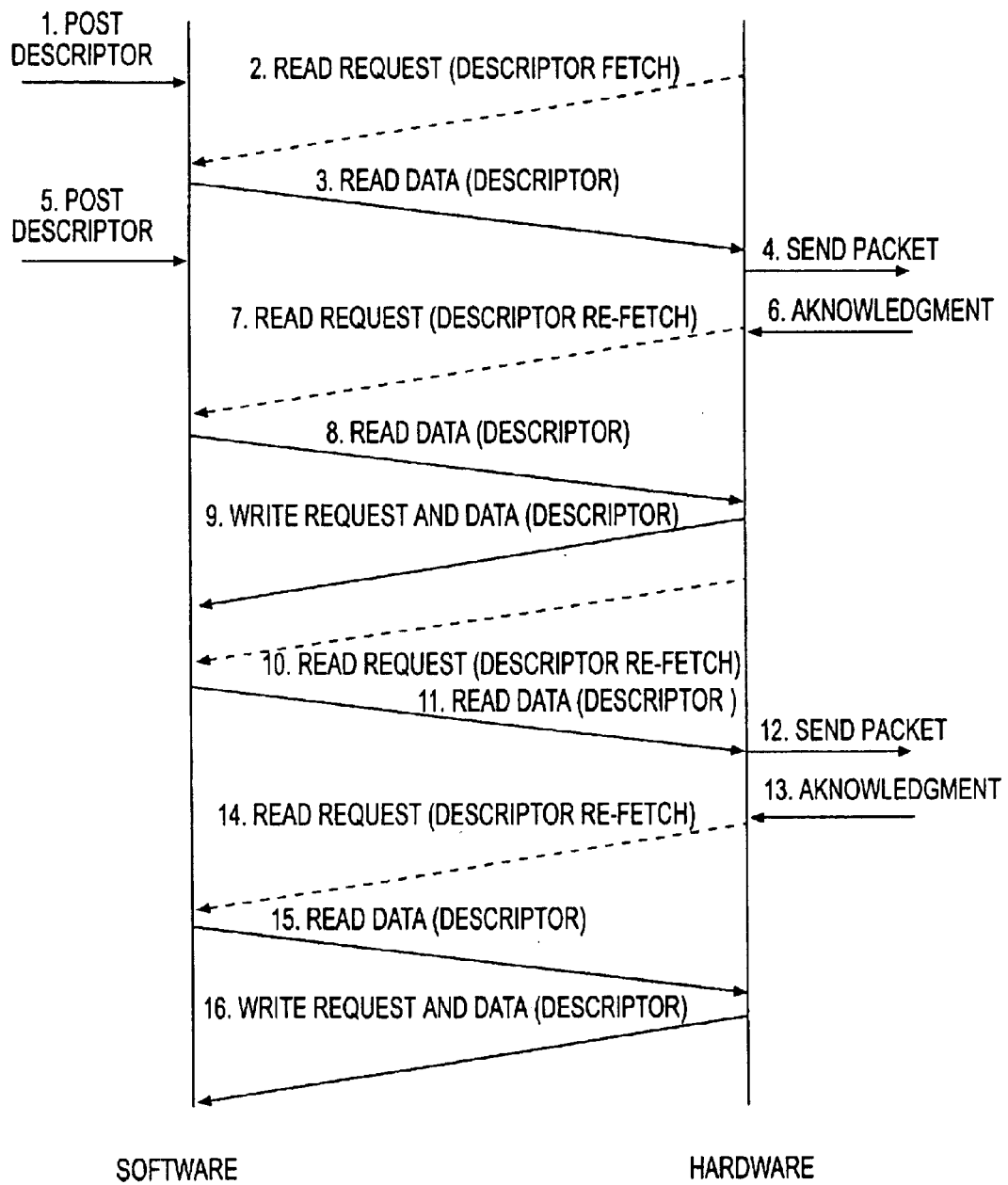
FIG. 1 illustrates an exemplary data transfer sequence associated with a system bus protocol using descriptors.

Methods, systems and articles of manufacture consistent with features and principles of the present invention enable a computer system to reduce the number of data transfers when processing descriptors during a data transfer operation. Software, that may be executed by a host processor within a computer system, posts a new descriptor to a set, for example a list, in memory each time the host processor requires the transmission of a data packet. While posting the new descriptor, the software determines the size of the new descriptor, and based on the determination, may embed the new descriptor within a previous descriptor included in the list.

Methods, systems and articles of manufacture consistent with the present invention may also enable a hardware device to efficiently process data transfers associated with the posted descriptors. The hardware device reads a current descriptor from the list, and sends an associated data packet to a recipient. When the hardware device receives a status message associated with the transmitted data packet, it writes a completion code to the current descriptor associated with the transmitted data packet. Furthermore, the hardware device may be configured to check for an embedded descriptor within the current descriptor. In one aspect of the invention, the hardware device may check a flag set by the software within the current descriptor that reflects the presence of an embedded descriptor. When the hardware device detects an embedded descriptor within the current descriptor, it transmits a data packet associated with the embedded descriptor, without having to read the embedded descriptor from the list in memory.

Methods, systems, and articles of manufacture, consistent with features and principles of the present invention, may be configured, based on the size of the descriptors, to allow continuous data transmissions without requiring a hardware device to perform the initial read in a read-RMW operation associated with the descriptors stored in the local memory.

Reference will now be made in detail to the exemplary embodiments of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

Figure 2:
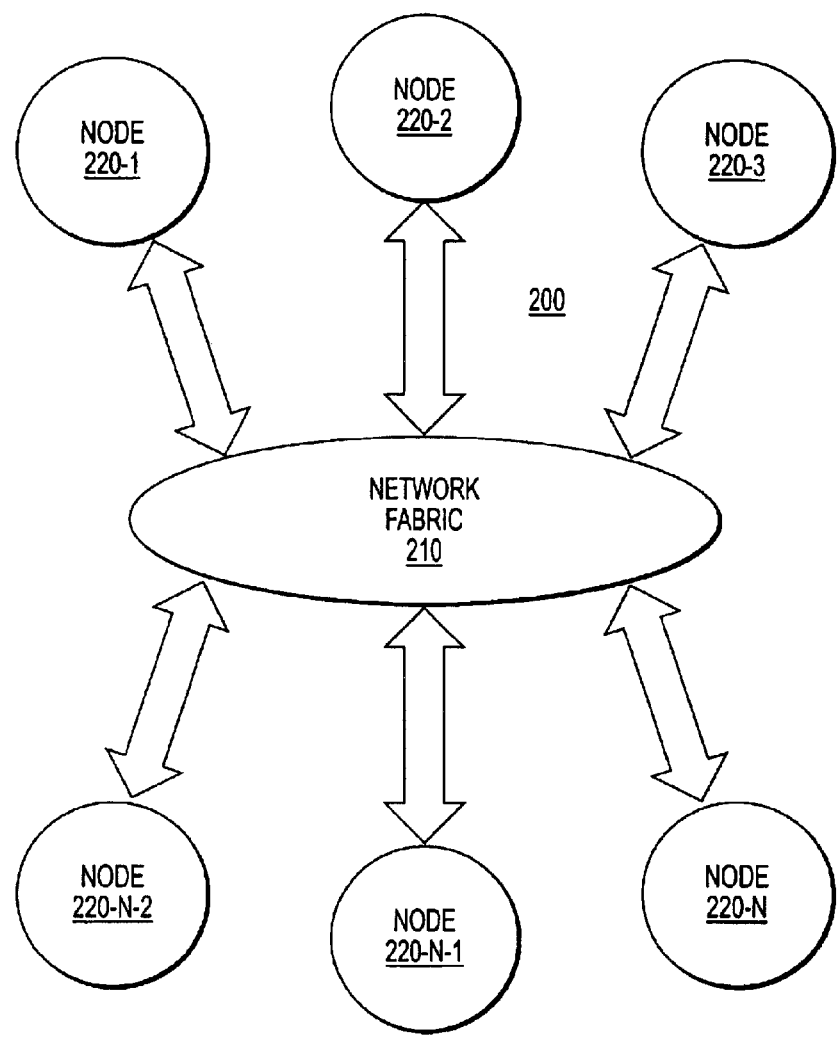
FIG. 2 illustrates an exemplary system environment consistent with features and principles of the present invention.

FIG. 2 illustrates an exemplary system environment 200 in which features and principles consistent with the present invention may be implemented. As shown, system environment 200 includes network fabric 210 interconnecting nodes 220-1 to 220-N.

Network fabric 210 is an interconnect for nodes 220-1 to 220-N, and may be implemented as any type of communications fabric such as, for example, a telephony-based network, a local area network (LAN), a wide area network (WAN), a dedicated intranet, the Internet, and/or a wireless network. Any suitable combination of point-to-point communications or networked communications may also be incorporated into network fabric 210 to facilitate communication between the nodes illustrated in FIG. 2. Network fabric 210 may comprise of a plurality of components, such as switches, routers and channel adapters, interconnected by links. Each component (not shown) of network fabric 210 may attach to a single other component, such as a switch or router, or multiple components. The links may interconnect the components to form the network fabric 210. A link may be a copper cable, an optical cable, or a printed circuit wiring on a backplane. Thus, system environment may represent a plurality of remotely located nodes 220-1 to 220-N, a plurality of process nodes within a common system environment, or a combination of both.

Figure 3:
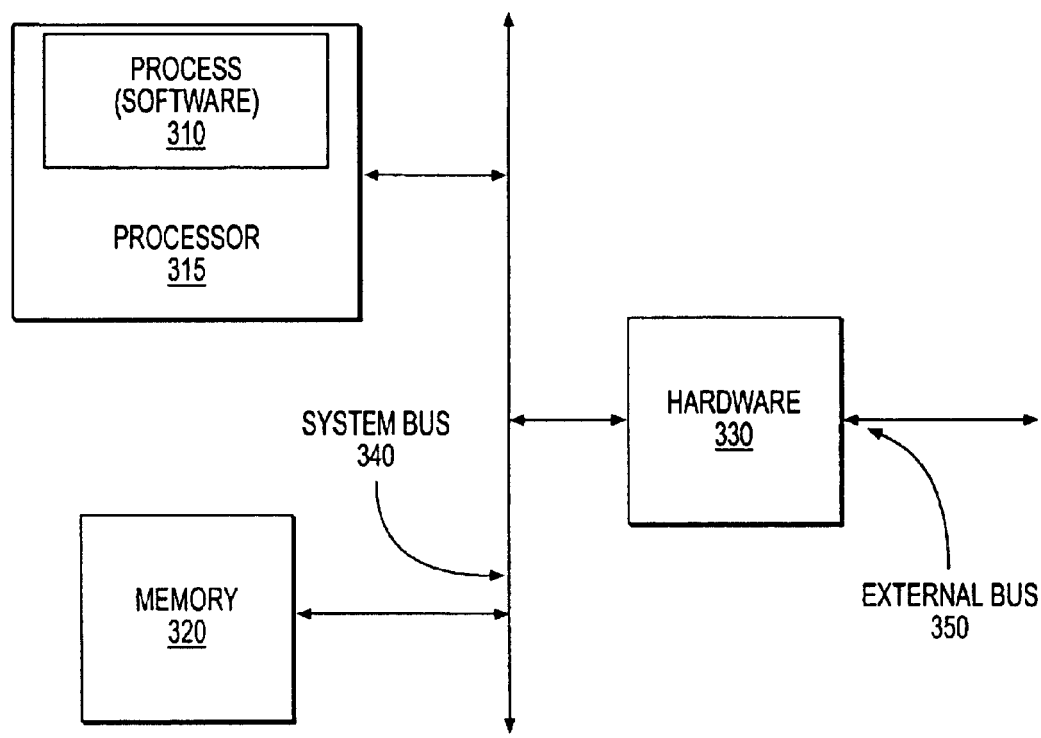
FIG. 3 illustrates an exemplary block diagram of a processor node consistent with features and principles of the present invention.

Nodes 220-1 to 220-N may be a processor node, an I/O unit and/or a router node to another network (not shown). Nodes 220-1 to 220-N may be implemented using virtually any type of computer system and configuration. Nodes 220-1 to 220-N may include single or multiple software based processes interacting with various hardware elements, such as I/O devices, memory devices and co-processing devices. FIG. 3 illustrates an exemplary node 220-N consistent with features and principles of the present invention.

As shown in FIG. 3, node 220-N may include a software process 310, a local memory 320, a hardware device 330, a system bus 340, and an external bus 350. Although FIG. 3 shows only three components (process 310, memory 320, and hardware 330), additional components may be present to compliment and/or supplement the operations performed by each of the components depicted in FIG. 3.

Software process 310 may be a process executed by a processor (315) within system node 220-N. Software process 310 may represent any type of process performed by a host processor within a computer system, including, but not limited to, generating and maintaining descriptors associated with data packets that the host processor wishes to send to another node in system environment 200.

Memory 320 may be any type of memory device configured to store information. This may include, but is not limited to, semiconductor, magnetic, and optical type memories. Additionally, memory 320 may be configured as a quick access based memory device, such as a cache memory, and may be associated with various addressing schemes, such as virtual addressing. Furthermore, memory 320 may be configured as a single or multiple memory devices and may be located within, or external to, processor 315. Memory 320, may store, among other things, the descriptors generated by software process 310. The descriptors may be stored as a set, for example a list, within a sequential block of address spaces reserved for descriptors. Alternatively, memory 320 may store the descriptors in various, non-contiguous physical addresses, with their corresponding virtual addresses being sequentially maintained. Moreover, the list of descriptors may be accessed using various accessing schemes, including, but not limited to, a First-In-First-Out (FIFO) accessing scheme. In addition to the descriptors, memory 320 may store data associated with each descriptor included in the list. The data may be stored in the same memory component of memory 320, or may be located in one or more other memory components that may make up memory 320.

Hardware device 330 may represent any number of devices that interface with system bus 340 to exchange information with process 310 and/or memory 320. In one aspect of the invention, hardware device 330 may be an I/O device, such as a DMA controller, configured to process data transfer requests to external devices, such as an external memory device. In another aspect of the invention, hardware device 330 may be an interface device to transfer data to and from other nodes within system environment 200. Hardware device may be configured as any type of processor or controller that may perform the functions associated with the features and principles consistent with the present invention.

In one aspect of the invention, hardware device 330 may be configured to access descriptors stored in memory 320, using system bus 340. Hardware device 330 may access the descriptors in response to polling memory 320 and/or software process 310 to determine whether a first descriptor on a descriptor list is valid. Alternatively, hardware device 320 may receive a notification, such as a token, that includes an identifier associated with a descriptor list that has been modified with a new descriptor. In either configuration, polling and notification, once hardware device 330 determines that a descriptor has been posted by software process 310, it may access the posted descriptor by using the address of the descriptor list that includes the posted descriptor. Additionally, hardware device 330 may be configured to transfer the data stored in memory 320 as packets to a recipient over external bus 350 and receive data packets from other nodes of system environment 200 over external bus 350.

System bus 340 may be any type of system or memory bus that facilitates the exchange of data between hardware device 330, software process 310 and memory 320. System bus 340 may include a number of links or bus lines, as well as operate under a variety of different communication protocols. For example, system bus 340 may restrict the transfer of data between attached components to a certain size, such as a byte, word, or cacheline. Thus, hardware device 330 may only retrieve data in the size defined by the communication protocol implemented by, and the configuration of, system bus 340.

External bus 350 may be any type of communication bus that facilitates the exchange of messages between hardware device 330, and other components not attached to system bus 340. The other components maybe remote or local to node 220-N. Messages may include, among other things, address, control, and data information.

Figure 4:
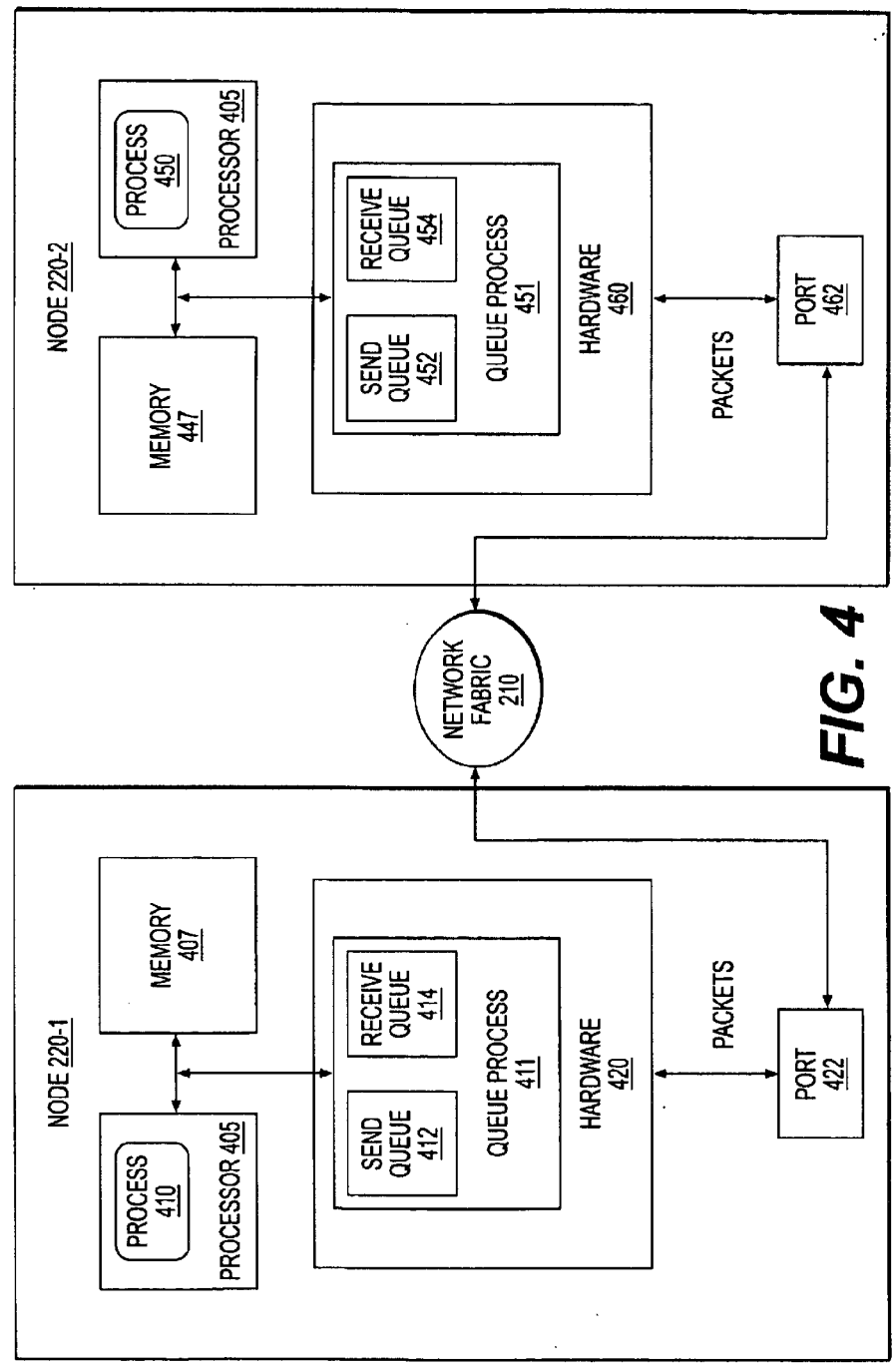
FIG. 4 illustrates another exemplary block diagram of a processor node consistent with features and principles of the present invention.

The exemplary node illustrated in FIG. 3 describes a generic configuration of a single node 220-1 to 220-N included in system environment 200. FIG. 4 illustrates another exemplary block diagram of two nodes 220-1 and 220-2 interconnected by network fabric 210 included in system environment 200, consistent with features and principles of the present invention.

As shown in FIG. 4, two nodes, 220-1 and 220-2, are interconnected by network fabric 210. Each node, 220-1 and 220-2 may be located within computer systems remotely located from each other and interconnected by network fabric 210. Alternatively, network fabric 210 may be a interconnect, such as a backplane or system bus, that connects nodes 220-1 and 220-2 within a common computer system.

As shown in FIG. 4, node 220-1 may comprise a process 410, queue process 411, hardware device 420 and communication port 422. Queue process 411 may further comprise of a send queue 412 and a receive queue 414. Node 220-2 may comprise of process 450, queue process 451, hardware device 460 and communication port 462. Queue process 451 may also further comprise a send queue 452 and a receive queue 454. Although FIG. 4 only shows a single process within each node 220-1 and 220-2 (process 410 and process 450, respectively), multiple processes may be included within each node.

Each process, 410 and 450, may represent a software process that is executed by a processor, 405 and 445, respectively, within each node and performs functions consistent with features and principles of the present invention. For instance, processes 410 and 450 may generate and post descriptors in a local memory 407, 447, respectively, each time a respective process wants to transfer data from the local memory to an external entity, such as the other node. As with memory 320 shown in FIG. 3, memories 407 and 447 may also maintain a list of descriptors in a sequential block of memory. Also, as with memory 320, the sequential block of memory within memories 407, 447 may be associated with virtual memory addresses. Furthermore, memories 407 and 447 located within each node 220-1 and 220-2 may also store the data associated with each descriptor generated by each respective process, 410 and 450. Alternately, another memory device may be implemented by each node 220-1 and 220-2 to store data the host processor in each node wants to transfer.

Queue processes 411 and 451 may represent processes that manage and facilitate the transfer of information between each node's respective memory (407, 447) and/or processes 410 and 450. Each queue process 411 and 451 may comprise of buffer components, such as send and receive queues, 412, 452, and 414, 454, respectively. Send queues 412 and 452 may be configured to transfer data from hardware device 420, 460 to process 410, 450 as well as memories 407 and 447, respectively. Receive queues 414 and 454 may be configured to accept data from process 410, 450, respectively. Furthermore, receive queues 414 and 454 may be configured to accept data from memories 407, 447, respectively. Processes 410 and 450 may facilitate the transfer of data from memory 407, 447, respectively, by sending the information to the receive queue, 414 and 454, respectively. Furthermore, hardware devices 420 and 460 may request information, such as descriptors and their corresponding data, from memory 407, 447, respectively, and any other component that may be hosting this information. The requested information may be received at a respective receive queue 414, 452.

The communication link between queue processes 411 and 451 (and hardware devices 420 and 460) and processes 410 and 450 may be configured as a bus with specific protocols, similar to the system bus described with reference to FIG. 3. That is, based on the configuration of the bus, the communication link may support various sizes of data transfers between processes 410, 450, memories 407, 447, and queue processes 411 and 451. In one aspect of the invention, the communication protocol may support data transfers of cacheline sizes only.

Hardware devices 420 and 460 may be configured to process information received from processes, 410, 450, respectively, and network fabric 210, via ports 422, 462, respectively. Hardware devices 420 and 460 may be configured to operate as I/O devices for processes 410 and 450, respectively. In such a configuration, hardware devices 420 and 460 may act as a transport engine that interprets the descriptors posted by processes 410 and 450 in each node's respective memory, 407, 447. Hardware devices 420 and 460 may segment data retrieved from the local memory into packets, add routing headers (if necessary), and send the packets out ports 422 and 462, respectively. As a recipient of data packets, hardware devices 420 and 460 receive data packets from ports 422 and 462, respectively. Hardware devices 420 and 460 may associate the received packets with a particular process, based on the information included in the packets, and execute the process. In one aspect of the invention, hardware devices 420 and 460 may generate acknowledgment messages and send them back to the node that originated the received data packet. Furthermore, hardware devices 420 and 460 may also be configured to translate virtual addresses to physical addresses, and vice versa, to direct data packets to a proper location, either in local or remote memories.

Hardware devices 420 and 460 may be configured as any type of interface device using any type of components to handle information between each node's respective process and network fabric 210. In one aspect of the invention, hardware devices 420 and 460 may be configured as channel adapters within an Infiniband™ architecture ("IBA"). The IBA is an interconnect technology for interconnecting processor nodes and I/O nodes to form a system area network. The architecture is independent of the host operating system and processor platform and is designed around a point-to-point switched I/O fabric. Node devices are interconnected by cascaded switch devices within the fabric. The IBA defines hardware transport protocols sufficient to support both reliable messaging (send/receive) and memory manipulation semantics (e.g. remote direct memory accessing) without software intervention in the data movement path. The IBA may support implementations as simple as a single computer system and as complex as scalable computing systems with multiple host node computing elements, and replicated components for reliability purposes.

Channel adapters are components within a IBA processor node, such as nodes 220-1 and 220-2, that generate and receive packets. Accordingly, hardware devices 420 and 460 may be implemented as programmable DMA engines that allow DMA operations to be initiated locally or remotely, though network fabric 210. In such a configuration, hardware devices 420 and 460 may be interfaced with network fabric 210 using ports 422 and 462.

Ports 422 and 462 may be configured as a single port or multiple ports. Each port within ports 422 and 462 may be assigned a local identifier ("LID") or a range of LIDs. Each port 422 and 462 may be include their own send and receive buffers or queues to facilitate concurrent data transmission and reception. Hardware devices 420 and 460 may be configured to utilize the LIDs to transfer data packets to an appropriate recipient node, as well as to the appropriate process 410 and 450, respectively, using ports 422 and 462.

It should be noted that the configurations of nodes 220-1 and 220-2 as previously described are exemplary and not intended to be limiting. Variations to the configuration depicted in FIG. 4 may be implemented without departing from the scope of the present invention. For instance, queue processes 411 and 451 may be eliminated, and may be replaced with different interface components to facilitate the transfer of the descriptors and data from processes 410, 450 and memories 407, 447. Additionally, various types of nodes may be interconnected, such as an I/O node interfaced with a Direct Access Storage Device ("DASD"), and a processing node requesting information from the DASD.

Figure 5:
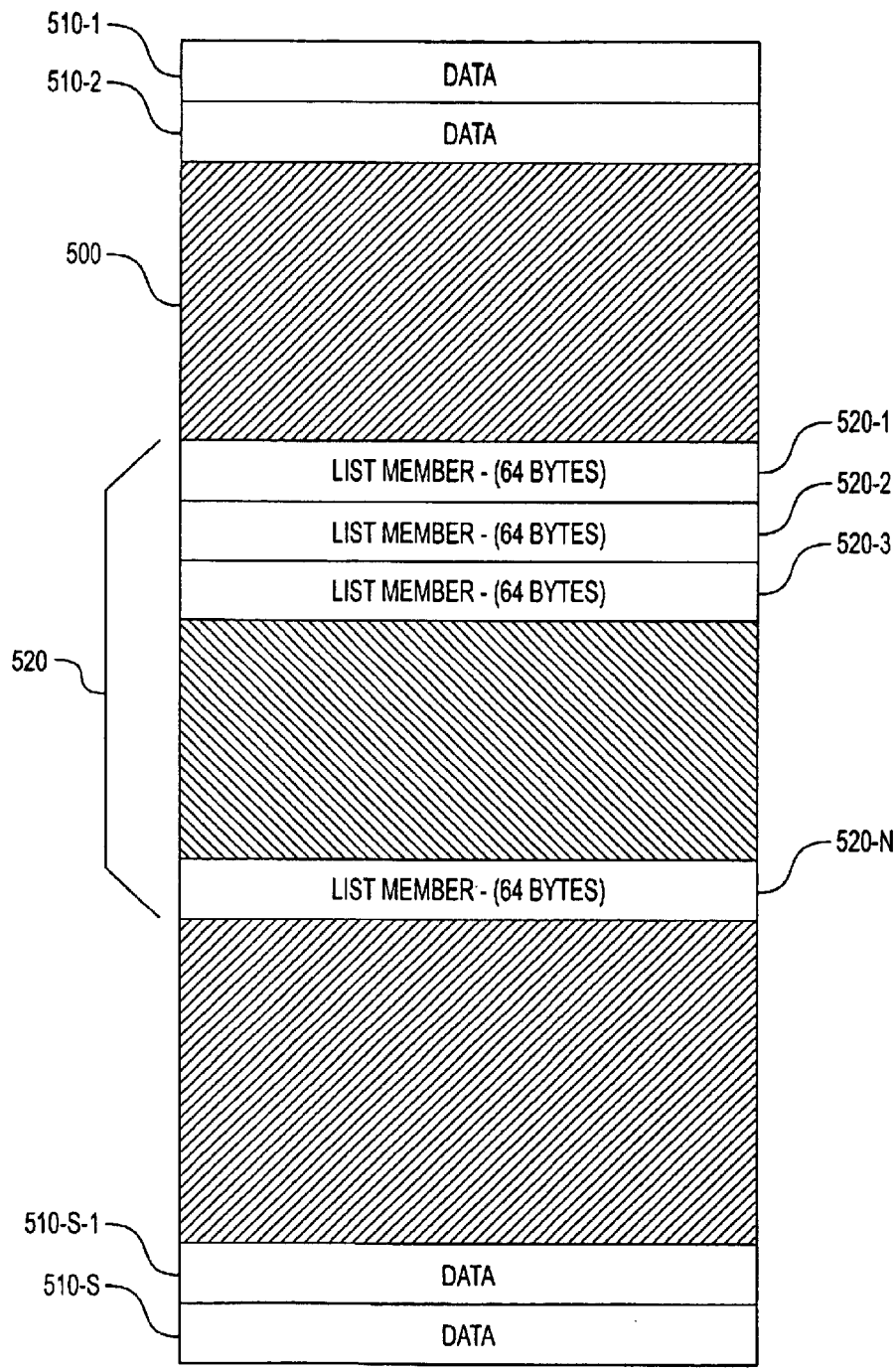
FIG. 5 illustrates an exemplary memory including a descriptor list, consistent with features and principles of the present invention.

As described, the nodes depicted in FIGS. 3 and 4, generate and receive data in support of tasks to be performed by system environment 200. In one aspect of the invention, descriptors are used by each node to facilitate the transmission of data. As mentioned earlier, descriptors are instructions that inform hardware what kind of data packet to transmit and may be stored in a list area reserved in a node's local memory. In one aspect of the invention, each list member may be 64 bytes and is reserved for each descriptor in order to house the largest descriptor, which, in this example, would be no larger than 64 bytes. Of course, different sizes may be implement for the list members as well as the descriptors. FIG. 5 illustrates an exemplary memory device storing data and includes an area reserved for a descriptor list.

As shown in FIG. 5, memory 500 includes memory locations 510-1 to 510-S. Each of these locations may be a predetermined size, such as 64 bytes or larger, depending on the characteristics of the memory and its use within a node of system environment 200. A block of these memory locations may be reserved for storing a descriptor list 520. Each of the members of the descriptor list (520-1 to 520-N) may be set at predetermined size as well. In one aspect of the invention, the size of each list member 520-1 to 520-N may be equal to one cacheline, or 64 bytes. This size is exemplary only and not intended to be limiting. Other sizes may be defined, and the size of the list member may be the same or different than the size of a memory location 510-1 to 510-S of memory 500. Furthermore, the relative location of the descriptor list 520 as illustrated in FIG. 5 is exemplary as well. The list may be placed in any location within memory 500. Also, the physical locations of the list members may be non-sequential within memory 520, with their corresponding virtual addresses being sequential. Additionally, memory 300 may be configured to store only list members, with data being stored in a separate memory device (not shown). Each list member 520-1 to 520-N is reserved for single descriptor consistent with features and principles of the present invention.

Descriptors may vary in size, and may not all be defined with the same size. In one aspect of the invention, and for exemplary purposes, descriptors may be defined in two sizes: full and small. Full size descriptors are larger than small size descriptors, and may be defined with a size up to 48 bytes. Small size descriptors may have a defined size of 16 bytes. It should be noted that the sizes of the descriptors described above are not intended to be limiting, and one of ordinary skill in the art would recognize that other sizes may be implemented, as well as, the use of more or less than two sizes of descriptors by methods and systems consistent with features of the present invention.

Figure 6:
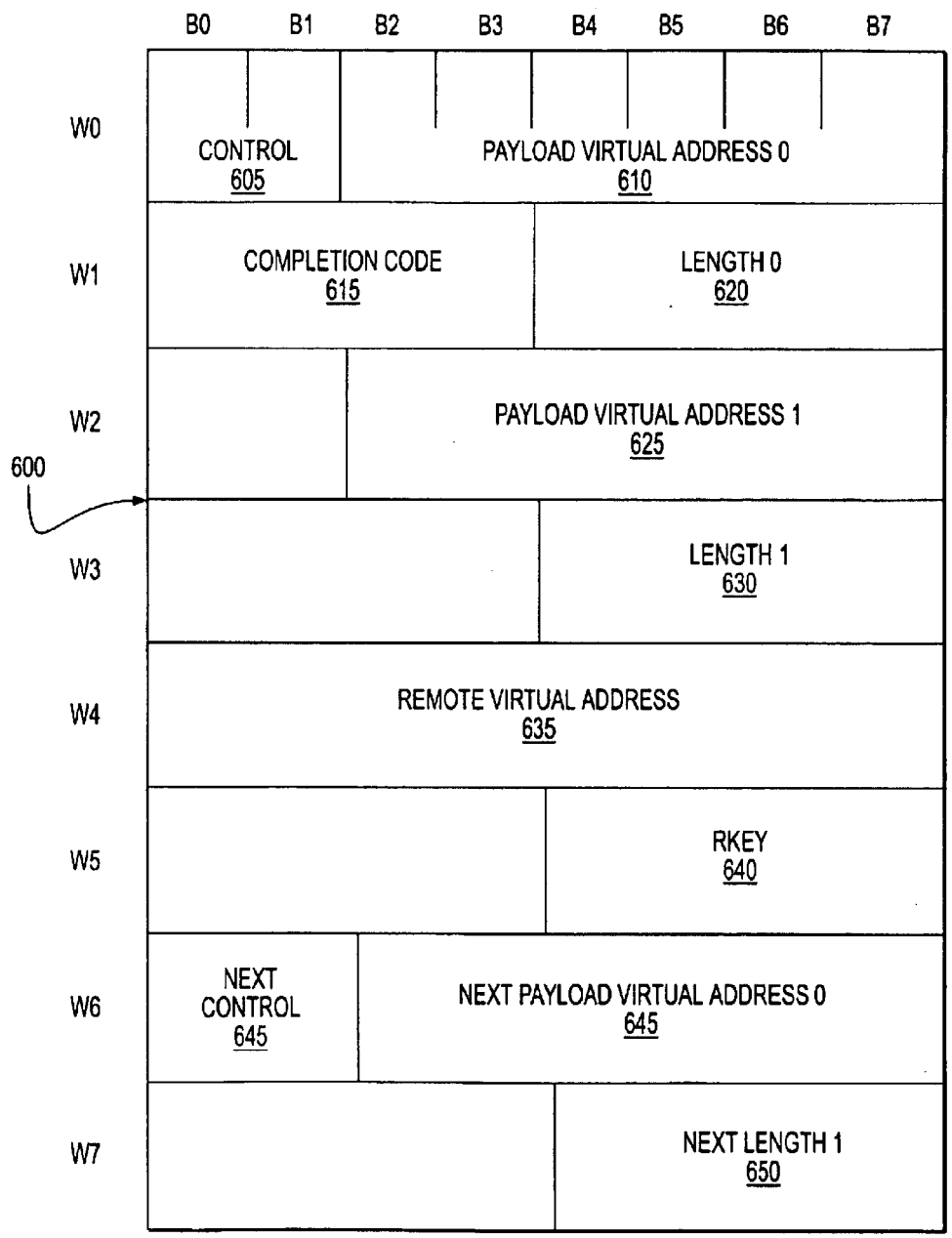
FIG. 6 illustrates an exemplary descriptor format consistent with features and principles of the present invention.

Notwithstanding their size, descriptors include various information used by the software and hardware of a node 220-N to transfer and receive data packets. FIG. 6 shows an exemplary diagram of a descriptor format consistent with features and principles of the present invention. As shown, descriptor 600 is separated into eight words (W0–W7), with each word further separated into eight bytes (B0–B7). Consistent with one aspect of the invention, and as shown in FIG. 6, each descriptor, regardless of size, occupies a 64 byte segment in a descriptor list. Descriptor 600 includes various fields (605 to 650) that are used by the software and hardware (i.e., processes 410, 450 and hardware devices 420,460, respectively) of a node 220-N to facilitate the transfer of data packets within system environment 200.

Collectively, words W0 and W1 may include fields that are required by a small descriptor in accordance with one aspect of the invention. These words may include four fields: control field 605, payload virtual address 0 field 610, completion code field 615, and length 0 field 620. Control field 605 may contain valid bits that reflect the presence of a valid descriptor within at least words W0–W1, and possibly words W2–W5 as well. Software sets the control field 605 when a descriptor is generated and stored in the appropriate word locations of descriptor format 600. Payload virtual address 0 field 610 may contain a pointer to a first data location that includes the data to be transmitted and associated with the descriptor stored in descriptor format 600. As shown in FIG. 6, the pointer may reflect a virtual address associated with the data, however, physical addresses may be used depending on the addressing scheme utilized by node 220-N. Completion code field 615 may include a code that reflects the status of the task to be performed associated with the data pointed to by the payload virtual address field 610. The completion code field 615 may indicate an "error," "success," or "not ready" status associated with the transmission of the data associated with the descriptor. For instance, referring to FIG. 4, when hardware 420, 460 receives an acknowledgment from a recipient indicating that a data packet was successfully transmitted, the completion code field 615 is updated to reflect the successful status of the task performed for the data identified by the descriptor. On the other hand, an unsuccessful transmission of the data packet may direct hardware 420,460 to update the completion code field 615 to indicate an "error" status. A "not ready" status may indicate to software that the status of the task to be performed (i.e., transmission of a data packet) is not available, and may be indicated by all zeroes in the completion code field 615. Of course, other types of status codes may be implemented by methods and systems consistent with features of the present invention, and are not limited to the above examples. Finally, the length 0 field 620 may indicate length of the data location pointed to by the payload virtual address 0 field 610.

A small descriptor (16 bytes) may include words W0–W1. In addition to these words, a large descriptor (up to 48 bytes), depending on the type of data packet it represents, may require either another local data location or a remote data allocation. Words W2–W3 include a payload virtual address 1 field 625 and length 1 field 630, respectively. These words may be associated with data that may need an extra data location, thus another pointer field by the descriptor to locate the data to be transmitted. Accordingly, a full size descriptor that requires an extra data location may include words W0–W3 (32 bytes).

Large descriptors, however, may also be associated with a Remote Direct Memory Access (RDMA) packet. An RDMA data packet is associated with tasks to access memory on a remote system without interrupting the processing of any CPUs or processes on the remote system. Although the term "remote" may be used to describe an entity remotely located from a sending entity, RDMA operations may take place within the same node or system. In one aspect of the invention, the RDMA data packets may require a remote data location. Accordingly, an RDMA data packet may require the remote virtual address field 635 and remote key "RKey" field 640 located in words W4 and W5, respectively. The Remote virtual address field 635 points to the remote address location associated with an RDMA data packet and the RKey field 640 may reflect a value used for security purposes to authorize non-trustworthy requestors using RDMA operations. An RDMA data packet may or may not include the second payload virtual address and length fields in words W2–W3 along with words W4 and W5. Accordingly, it is possible to have a full size descriptor requiring words W0–W5 (48 bytes).

The last two words of descriptor 600, W6–W7, are not used for the descriptor. Accordingly, in one aspect of the invention, these words may be used to embed a subsequent descriptor included in a descriptor list. As shown in FIG. 6, word W6 includes a next control field 645 and a next payload virtual address field 645, while word W7 includes a next length field 650. Similar to control field 605, the next control field 645 may contain valid bits associated with the embedded descriptor defined in words W6 and W7. The next payload virtual address field 645 may include a pointer to the embedded data allocation containing the data associated with the embedded descriptor. And, the next length fields 650 may indicate the length of the data location identified in the next payload virtual address field 645.

As can be seen, in one aspect of the invention, only a small descriptor (16 bytes) may be embedded within descriptor 600 because of the limited size of word locations W6–W7 (16 bytes). The remaining word locations W2–W5 are not used to embed subsequent descriptors because they have be reserved for possible large descriptors (32 to 48 bytes).

Figure 7:
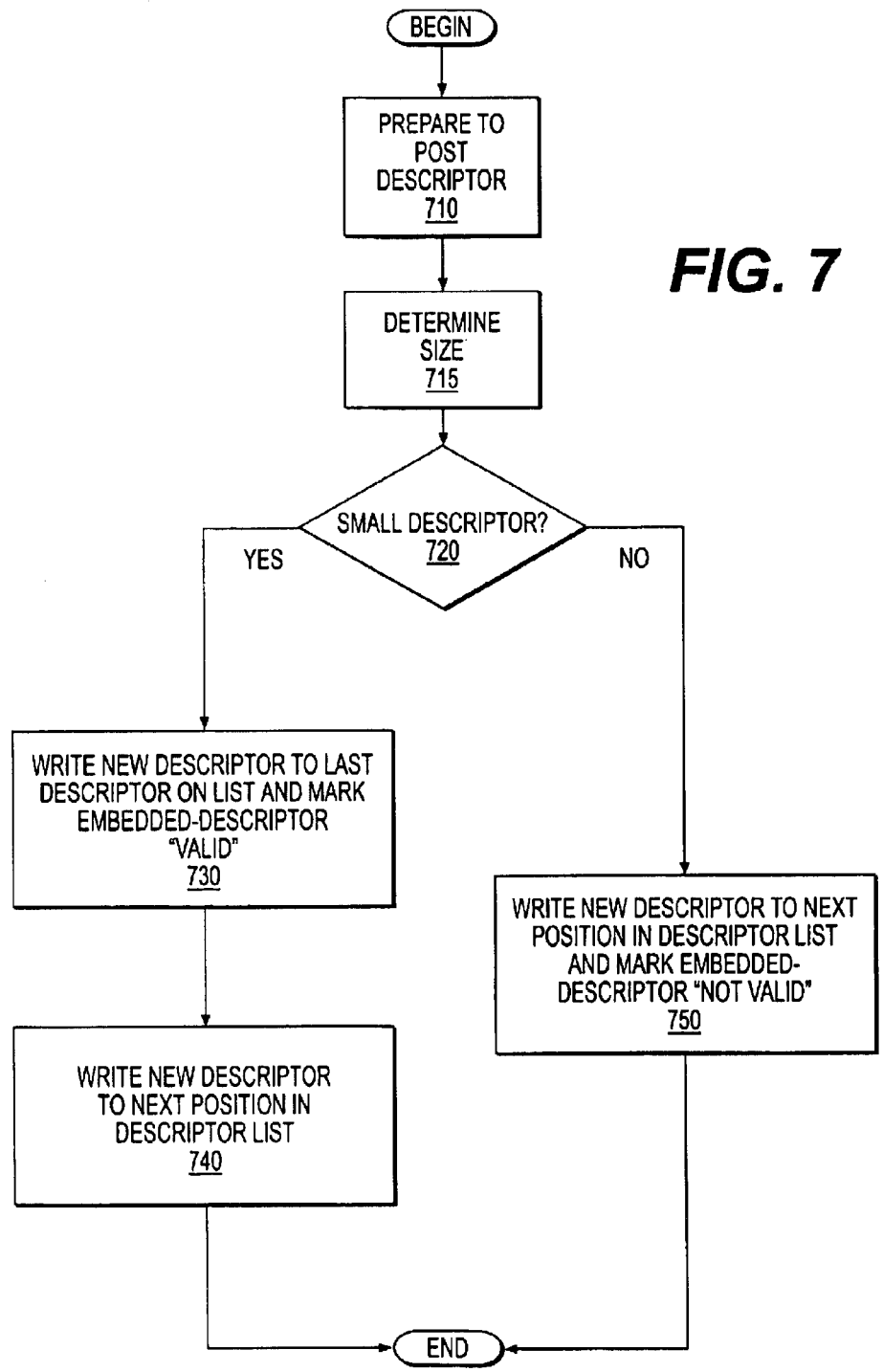
FIG. 7 illustrates an exemplary process performed by software consistent with features and principles of the present invention.
Figure 8:
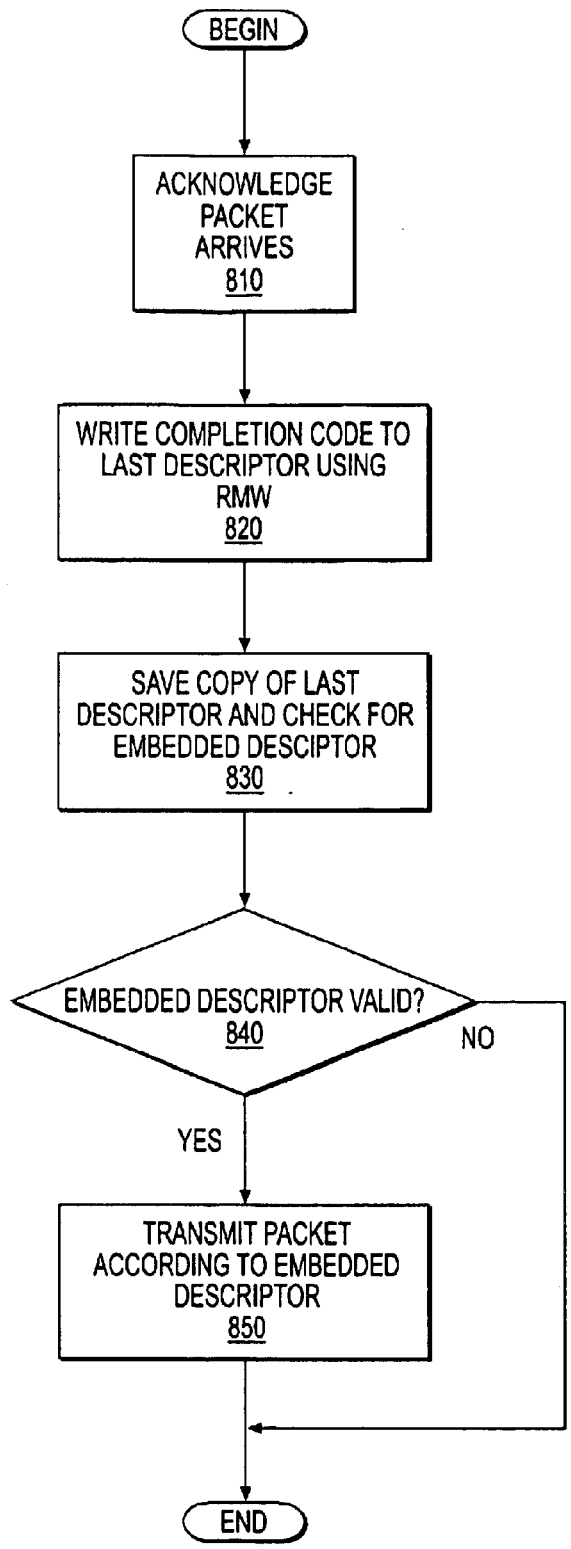
FIG. 8 illustrates a flow chart of the steps of an exemplary process performed by hardware consistent with features and principles of the present invention.

Methods, systems, and articles of manufacture consistent with features of the present invention may utilize the format of descriptor 600 to facilitate transmission of data packets between nodes 220-1 to 220-N in system environment 200. These methods and systems enable software and hardware within a node 220-N to reduce the number of transmissions during a read-RMW sequence when updating a descriptor. To further explain the operations associated with software and hardware of a node 220-N, FIGS. 7 and 8 show exemplary flowcharts of processes performed by the software and hardware, respectively. For exemplary purposes, node 220-1 shown in FIG. 4, and the descriptor list shown in FIG. 5 will be referred to when describing the processes of FIGS. 7 and 8. It should be noted that the following description of FIGS. 7 and 8 may also apply to any node depicted in FIGS. 2–4.

As shown in FIG. 7, when a software process 410 requires the transmission of a data packet, a new descriptor is created and prepared for posting in descriptor list 520 (Step 710). Before the new descriptor is stored in the descriptor list 520, however, the size of the descriptor is determined (Step 715). In one aspect of the invention, a small descriptor includes 16 bytes, while full descriptors have a size of 32 or 48 bytes. If the descriptor is determined to be small (Step 720; YES), the software process 410 may embed the new descriptor within words W6 and W7 of a last descriptor included in descriptor list 520. Furthermore, software process 410 may mark the next control field 645 as valid (Step 730) to indicate that the last descriptor includes the embedded new descriptor. Once the new descriptor is embedded in the last descriptor, software process 410 may write the new descriptor to the next available position in descriptor list 520 (Step 740) and the software descriptor posting process ends.

On the other hand, if the descriptor is not small (Step 720; NO), software process 410 may write the new descriptor in the next available position in descriptor list 520, and marks the next control field 645 as "not valid," indicating that the last descriptor does not include an embedded descriptor (Step 750), and the software posting process ends.

To better illustrate the embedding process performed by software process 410, consider descriptor list 520 shown in FIG. 5. In this example, list member 520-1 may contain a descriptor of any size (small or full). When software process 410 begins to post a new small descriptor, the new descriptor may be embedded within words W6 and W7 of the descriptor located in list member 520-1. Afterwards, the new descriptor is posted to list member 520-2, which is the next available location in descriptor list 520. The process shown in FIG. 7 may repeat itself for each new descriptor generated by software process 410. For instance, another full sized descriptor may be created after the small descriptor was posted in list member 520-2. Accordingly, because the full sized descriptor is too large to be embedded within words W6 and W7 of the descriptor posted in list member 520-2, software process 410 may post the full sized descriptor in list member 520-3 without performing an embedding operation.

As described, software process 410 posts all descriptors associated with data packets to be transmitted by hardware 420. FIG. 8 illustrates a exemplary process performed by hardware 420 to transmit the data packets and update the descriptors stored in descriptor list 520. As shown in FIG. 8, and for exemplary purposes, the process may begin after a previous data packet has been transmitted and is awaiting an acknowledgment message from a recipient of the transmitted data packet. When the acknowledgment message has arrived (Step 810), hardware 420 may write a completion code to completion code field 615 of the last descriptor associated with the transmitted data packet using a RMW sequence (Step 820). The completion code may indicate that the data packet has been transmitted and acknowledged by the recipient. The RMW sequence may involve reading the last descriptor from descriptor list 520, modifying the completion code field 615, and writing the modified last descriptor back to the descriptor list to replace the unmodified last descriptor. In one aspect of the invention, while hardware 420 is performing the RMW sequence, a copy of the last descriptor is saved in a memory location associated with hardware 420. Hardware 420 may then determine whether the next control field 645 of the saved last descriptor indicates the presence of an embedded descriptor (Step 830). If the next control field 645 indicates an embedded descriptor (Step 840; YES), hardware may utilize the embedded descriptor to transmit a data packet associated with the embedded descriptor without having to access descriptor table 520 (Step 850). Afterwards, the hardware process ends.

On the other hand, if there is no embedded descriptor within the saved last descriptor (Step 840; NO), the hardware process end and hardware 420 may have to access descriptor list 520 to obtain the next descriptor for processing.

Figure 9:
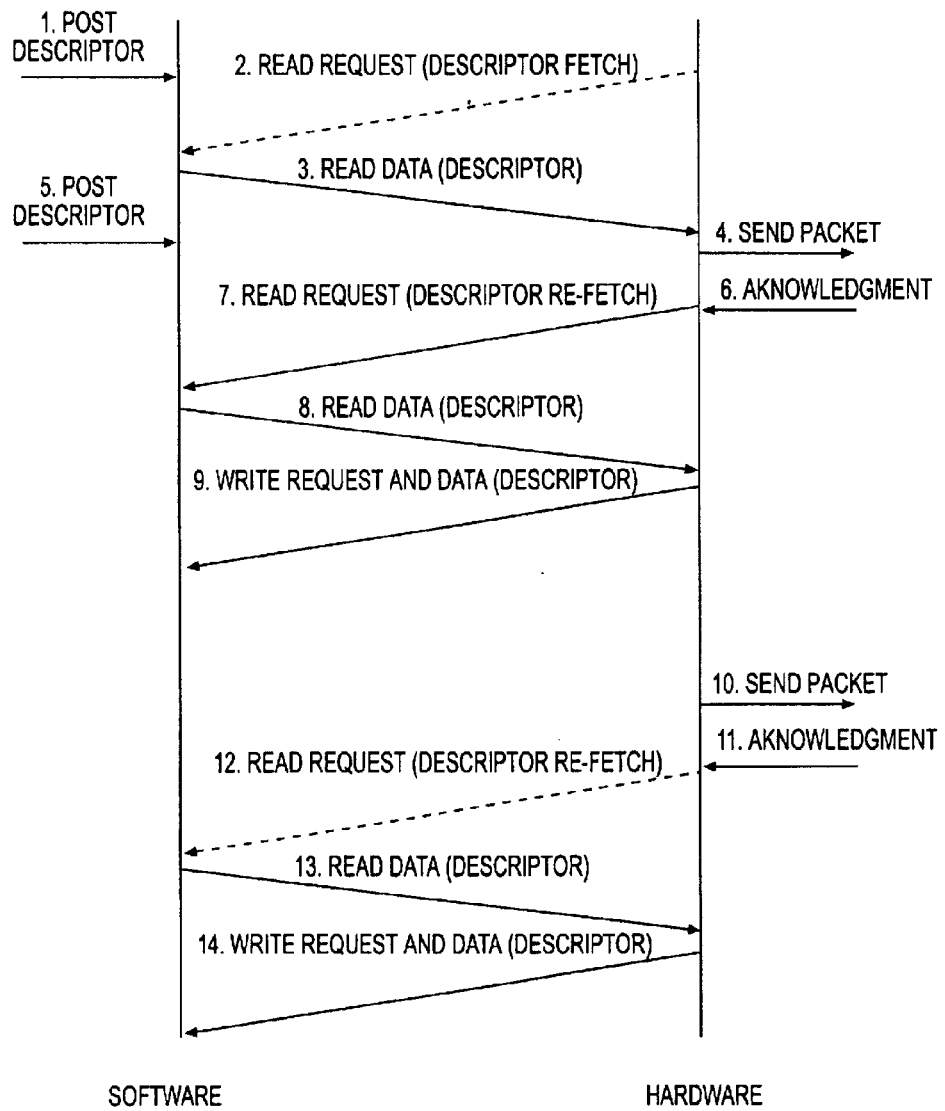
FIG. 9 illustrates an exemplary data transfer sequence consistent with features and principles of the present invention.

To better illustrate the embedding process performed by methods and systems consistent with features and principles of the present invention, FIG. 9 shows a transfer sequence associated with software process 410 and hardware process 420. It should be noted that the sequence illustrated in FIG. 9 may apply to any node 220-N depicted in FIGS. 2–4 as well. As shown in FIG. 9, the sequence begins when software 410 posts a descriptor in descriptor list 520 (Step 1—Post Descriptor). Hardware 420 then reads the descriptor to transmit a data packet by requesting the descriptor (Step 2—Read Request) and reading the descriptor (Step 3—Read Data). Once the descriptor is received, hardware 420 then transmits the data packet associated with the read descriptor (Step 4—Send Packet). At some point, software 410 may post a second descriptor associated with another packet of data to be sent (Step 5—Post Descriptor). Later, when hardware 420 receives an acknowledgment message for the first data packet transmitted (Step 6—Acknowledgment), a RMW is executed to write a completion code to the completion code field 615 of the first descriptor. The first descriptor is re-fetched from descriptor list 520 (Step 7—Read Request and Step 8—Read Data), and written back to the list after modification of the completion code field 615 (Step 9—Write Request and Data). As described in FIG. 8, hardware 420 may save a copy of the read descriptor in a local memory. At this point, hardware 420 then analyzes the next control field 645 of the saved descriptor to determine that an embedded descriptor is present within the saved descriptor. Hardware 420 then transmits another data packet associated with the embedded descriptor (Step 10—Send Packet). Finally, when an acknowledgment message is received (Step 11—Acknowledgment), hardware 420 may update the completion code field 645 associated with the embedded descriptor by performing a RMW sequence (Steps 12–14).

As can be seen, the exemplary sequence depicted in FIG. 9 shows a descriptor update process that reduces the number of transmissions between hardware and software by eliminating a read operation associated with the embedded descriptor. The reduction in memory accesses by hardware is substituted by an extra write by software to embed a descriptor within a previous descriptor in the descriptor list. This tradeoff may considered beneficial since processor (software) accesses to memory are not as costly as an I/O device (hardware) access to memory because of the high probability of the processor obtaining hits in an associated cache memory.

Methods, systems, and articles of manufacture consistent with features of the present invention allow software and hardware of a computer system to work together to decrease the amount of traffic on a bus, such as a system bus. Accordingly, the present invention may be useful for I/O devices (hardware) that experience bottlenecks at the system bus based on the communication protocol associated with the bus.

Variations of the methods and systems consistent with features of the present invention previously described may be implemented without departing from the scope of the invention. For example, the size of a list member of the descriptor list may be configured to comply with various sized descriptor formats. Additionally, the list members may be adjusted to be compatible with various bus protocols that require various sizes of data transmissions between elements connected to a system bus.

Furthermore, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents.

What is claimed is:

1. A method for processing descriptors, comprising:

reserving a location in a memory for a set of descriptors, wherein each descriptor is associated with a respective packet of data;

separating the location into sections;

assigning a single descriptor to each section, wherein each assigned descriptor may vary in size and may include a reserved portion available for an embedded descriptor; and for each of one or more new descriptors:
determining the size of the new descriptor; and
embedding the new descriptor within the reserved portion of another descriptor in the set when the size of the new descriptor is determined to be equal to or less than the size of the reserved portion.

2. The method of claim 1, wherein embedding the new descriptor is replaced with:

providing the new descriptor to a new section associated with the set when the size of the new descriptor is determined to be larger than the reserved portion.

3. A method for performing data transfers, comprising:

providing an ordered list of descriptors;

providing a first descriptor;

determining the size of the first descriptor; and embedding the first descriptor into a second descriptor included in the list of descriptors based on the determination.

4. The method of claim 3, wherein the first descriptor is a new descriptor and wherein the second descriptor is a last descriptor included in the list of descriptors.

5. The method of claim 4, further comprising:

placing the first descriptor in the list following the second descriptor.

6. The method of claim 3, wherein embedding the first descriptor into a second descriptor comprises:

providing a location reserved for a next sequential descriptor in the list;

placing the first descriptor into the location reserved for a next sequential descriptor in the list; and embedding the first descriptor into a first reserved location associated with the second descriptor when the size of the first descriptor is determined to be less than or equal to the size of the first reserved location.

7. The method of claim 3, further comprising:

transmitting a first data packed associated with the second descriptor;

receiving a response message associated with the first data packet;

updating information within the second descriptor based on the response message;

determining the presence of an embedded descriptor within the second descriptor; and transmitting a second data packet associated with the embedded descriptor based on the determination.

8. The method of claim 7, wherein updating information within the second descriptor comprises; setting a flag in a location within the second descriptor that reflects whether the first data packed was acknowledged; and setting a flag in a location within the second descriptor that reflects whether a descriptor is embedded within the second descriptor; and wherein determining the presence of an embedded descriptor within the second descriptor comprises:

determining whether a flag is set within the second descriptor that reflects whether a descriptor is embedded within the second descriptor.

9. A system for performing data transfers, comprising:

means for providing an ordered list of descriptors;

means for providing a first descriptor;

means for determining the size of the first descriptor; and means for embedding the first descriptor into a second descriptor included in the list of descriptors based on the determination.

10. The system of claim 9, wherein the first descriptor is a new descriptor and wherein the second descriptor is a last descriptor included in the list of descriptors.

11. The system of claim 10, further comprising:

means for placing the first descriptor in the list following the second descriptor.

12. The system of claim 9, wherein the means for embedding the first descriptor into a second descriptor comprises:

means for providing a location reserved for a next sequential descriptor in the list;

means for placing the first descriptor into the location reserved for a next sequential descriptor in the list; and means for embedding the first descriptor into a first reserved location associated with the second descriptor when the size of the first descriptor is determined to be less than or equal to the size of the first reserved location.

13. The system of claim 9, further comprising:

means for transmitting a first data packed associated with the second descriptor;

means for receiving a response message associated with the first data packet;

means for updating information within the second descriptor based on the response message;

means for determining the presence of an embedded descriptor within the second descriptor; and means for transmitting a second data packet associated with the embedded descriptor based on the determination.

14. The method of claim 13, wherein the means for updating information within the second descriptor comprises;

means for setting a flag in a location within the second descriptor that reflects whether the first data packed was acknowledged; and means for setting a flag in a location within the second descriptor that reflects whether a descriptor is embedded within the second descriptor; and wherein the means for determining the presence of an embedded descriptor within the second descriptor comprises:

means for determining whether a flag is set within the second descriptor that reflects whether a descriptor is embedded within the second descriptor.

15. A computer-readable medium including instructions for performing a method, when executed by a processor, for performing data transfers, the method comprising:

providing an ordered list of descriptors;

providing a first descriptor;

determining the size of the first descriptor; and embedding the first descriptor into a second descriptor included in the list of descriptors based on the determination.

16. The computer-readable medium of claim 15, wherein the first descriptor is a new descriptor and wherein the second descriptor is a last descriptor included in the list of descriptors.

17. The computer-readable medium of claim 16, wherein the method further comprises:

placing the first descriptor in the list following the second descriptor.

18. The computer-readable medium of claim 15, wherein embedding the first descriptor into a second descriptor comprises:

providing a location reserved for a next sequential descriptor in the list;

placing the first descriptor into the location reserved for a next sequential descriptor in the list; and embedding the first descriptor into a first reserved location associated with the second descriptor when the size of the first descriptor is determined to be less than or equal to the size of the first reserved location.

19. The computer-readable medium of claim 15, wherein the method further comprises:

transmitting a first data packed associated with the second descriptor;

receiving a response message associated with the first data packet;

updating information within the second descriptor based on the response message;

determining the presence of an embedded descriptor within the second descriptor; and transmitting a second data packet associated with the embedded descriptor based on the determination.

20. The computer-readable medium of claim 19, wherein updating information within the second descriptor comprises; setting a flag in a location within the second descriptor that reflects whether the first data packed was acknowledged; and setting a flag in a location within the second descriptor that reflects whether a descriptor is embedded within the second descriptor; and wherein determining the presence of an embedded descriptor within the second descriptor comprises:

determining whether a flag is set within the second descriptor that reflects whether a descriptor is embedded within the second descriptor.

* * * * *